UNITED STATES PATENT OFFICE.

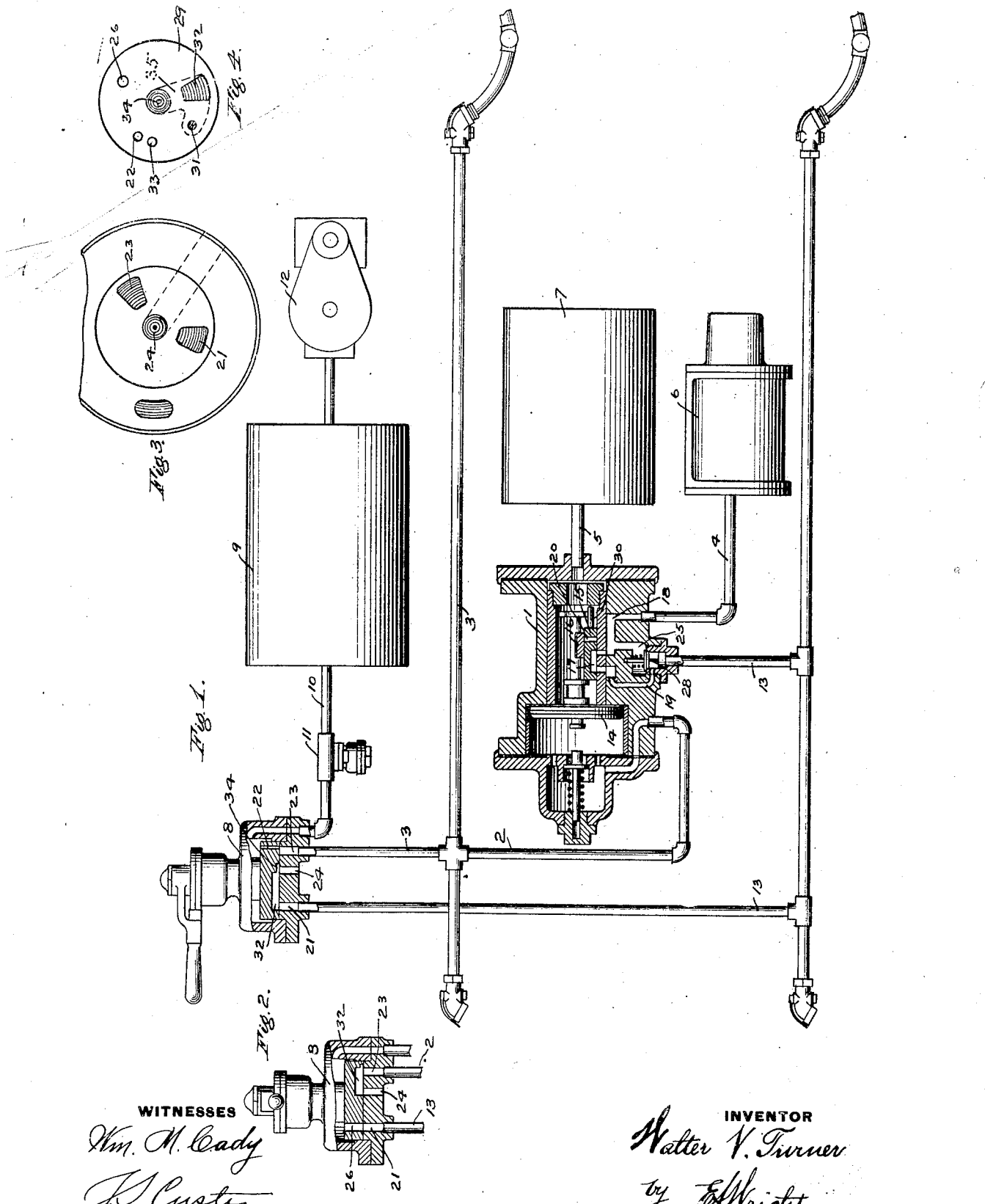

WALTER V. TURNER, OF EDGEWOOD, PENNSYLVANIA, ASSIGNOR TO WESTINGHOUSE AIR BRAKE COMPANY, OF PITTSBURGH, PENNSYLVANIA, A CORPORATION OF PENNSYLVANIA.

HIGH-PRESSURE EMERGENCY-BRAKE.

1,104,850.  Specification of Letters Patent.  Patented July 28, 1914.

Application filed December 27, 1907. Serial No. 408,259.

*To all whom it may concern:*

Be it known that I, WALTER V. TURNER, a citizen of the United States, residing at Edgewood, in the county of Allegheny and State of Pennsylvania, have invented new and useful Improvements in High-Pressure Emergency-Brakes, of which the following is a specification.

My invention relates to fluid pressure brakes, and has for its principal object to provide improved means for obtaining a high pressure in the brake cylinder in an emergency application of the brakes.

Another object of my improvements is to provide in a triple valve device, having a main slide valve and an auxiliary graduating valve, means for preventing inward movement of the main valve beyond the normal release position thereof, there being some liability of such movement, by reason of the momentum of the parts in shifting to normal release position.

In the accompanying drawing; Figure 1 is a diagrammatic view of a car air brake equipment, with a preferred form of my invention applied thereto, the triple valve device and the brake valve being shown in section; Fig. 2 a central sectional view of the above brake valve, showing the position of the ports in the emergency application position; Fig. 3 a plan view of the rotary valve seat in the brake valve, showing the location of ports therein; and Fig. 4 a face view of the rotary valve for said brake valve, showing the arrangement of its ports and cavities.

Though adapted for general use, I have preferred to illustrate my improvements as applied to a form of apparatus such as covered in the prior Patent No. 841,751, to H. H. Westinghouse, dated Jan. 22, 1907. In the above patent, a brake cylinder release pipe is employed on the engine or the head car of the train, which is connected to triple valve exhaust port and leads to the brake valve, ports being provided in said brake valve, whereby in one position, air is supplied to the train pipe for releasing the train brakes while holding the brake cylinder exhaust port closed on the engine or head car, and in another position of the brake valve the brake cylinder pressure on said engine or head car may be graded down or entirely released, as desired.

According to one construction of my invention, an additional port may be provided in the brake valve for supplying air in the emergency position to the brake cylinder release pipe, and thence to the brake cylinder, a direct connection being provided from said brake cylinder release pipe to the brake cylinder.

The brake apparatus on the car may comprise a triple valve device 1, connected by branch pipe 2 to the train pipe 3, by pipe 5 to auxiliary reservoir 7, and by pipe 4 to brake cylinder 6. A brake valve 8 is provided, the rotary valve chamber of which is adapted to be supplied with air from a main reservoir 9 through pipe 10 containing a feed valve 11 to limit the pressure to the desired standard train pipe pressure, the main reservoir pressure being maintained by an air compressor 12. The brake valve 8 has ports 23 and 21 leading to the train pipe 3 and to the brake cylinder release pipe 13 respectively, and a central exhaust port 24. The rotary valve 29 is provided with an exhaust cavity 35 having a central opening 34 in constant open communication with the exhaust port 24, an opening 31 adapted to register with train pipe port 23 in service position, and an opening 32 adapted to register with brake cylinder release port 21 in full release position, and with train pipe port 23 in emergency position, port 22 for supplying air to the train pipe port 23 in full release position, port 33 for supplying air to said port 23 in the position for holding the exhaust pipe 21 closed.

The triple valve device 1 comprises the usual piston 14 for operating the main slide valve 15 and the graduating valve 16, the main valve 15 being provided with a cavity 17 for connecting the brake cylinder passage 18 with a passage 19 which leads to the brake cylinder release pipe 13. When the brake valve is in full release position, the port 22 supplies air to the train pipe through port 23 thereby shifting the triple valve piston to release position in which the brake cylinder is open to the exhaust through cavity 17 in the main slide valve 15, port 19, brake cylinder release pipe 13, cavities 32 and 34 to the exhaust port 24. In service position the brake cylinder release port 21 is closed, and exhaust port 31 is connected with train pipe port 23, to effect the usual reduction in train pipe pressure, causing the triple valve to connect the service port 20 with brake cylinder port 18 and supply air to the brake cylinder.

The train brakes may be released and the engine or head car brakes held applied, by turning the brake valve to holding position, in which port 33 registers with train pipe port 23, so that air is supplied to the train pipe and forces the triple valve pistons to release position, but on the head car or engine, the brake cylinder release port 21 being lapped by the brake valve, the air is held in the brake cylinder and the head brakes consequently remain applied. The brake cylinder pressure on the head car may now be graded down by turning the brake valve to full release position, in which the exhaust cavity 32 registers with brake cylinder release port 21, the train pipe pressure being maintained by the port 22 in this position, and then back to holding position, in which the port 21 is lapped, or the brake cylinder pressure on said car may be wholly released by turning the brake valve to full release position, until the brake cylinder pressure is entirely released.

The above operation is similar to that of the construction covered in the patent hereinbefore mentioned, and in addition, according to my invention, I provide a port 26 in the rotary valve 29 which is adapted to register with the brake cylinder exhaust port 21 in the emergency position of the brake valve. I also provide a direct connection from the brake cylinder release pipe 13 to the brake cylinder, as, for example, the passage 25, which leads from pipe 13 to the brake cylinder passage 18, or a pipe connection from pipe 13 to brake cylinder pipe 4 may be employed. When an emergency application of the brakes is made, the large exhaust cavity 32 registers with the train pipe port 23, so that the train pipe pressure is suddenly reduced and causes the triple valves to assume the emergency position, supplying air from the auxiliary reservoir to the brake cylinder in the usual manner, at the same time, the emergency port 26 registers with port 21, and air from the rotary valve chamber is admitted to the brake cylinder release pipe 13, thence it flows through the direct passage 25 to passage 18 and the brake cylinder, thereby increasing the brake cylinder pressure on the head car or engine in the desired manner. In order to prevent return flow of air from the brake cylinder to the pipe 13, I preferably interpose a check valve 28 in the passage 25, thus should the train break in two or the pipe 13 burst, the check valve will prevent loss of brake cylinder pressure. For the requirements of the above purpose the spring acting on check valve 28 need only be a light spring sufficient to insure the seating of the check valve but preferably this spring is adjusted at about 10 pounds pressure, so that the maximum pressure supplied to the brake cylinder will be limited to 60 pounds where the feed valve 11 is adjusted at 70 pounds. This is for the purpose of insuring the release of the brakes after an emergency application thereof, as of course the auxiliary reservoir being open in emergency position to the brake cylinder the same will be charged to the full pressure supplied to the brake cylinder and if this pressure is substantially the same as the available train pipe pressure then there will be no excess of train pipe pressure for releasing the brakes.

Another feature of my invention comprises means for preventing inward movement of the main slide valve beyond the normal release position thereof. For this purpose, I preferably provide a stem or stop device 30, adapted to be secured to the inner end of the main slide valve 15 and of such length as to engage a rear portion of the triple valve casing or other convenient abutment when the main slide valve is in the full release position. It will now be apparent that by this means the main slide valve is prevented from overriding its normal release position.

Any other pipe adapted to connect the brake cylinder with the brake valve may be employed in carrying out my invention, as will be apparent, and if desired the pipe for supplying the high pressure in emergency may be coupled to other cars similarly equipped, by the usual hose connections, whereby the high emergency pressure may be obtained on all the cars of the train.

Having now described my invention, what I claim as new and desire to secure by Letters Patent is:—

1. In a fluid pressure brake, the combination with a train pipe and a triple valve, of a brake valve adapted to control the triple valve exhaust port and having means operative in emergency position to supply air to the brake cylinder.

2. In a fluid pressure brake, the combination with a train pipe and a triple valve, of a brake valve adapted to control the triple valve exhaust port and having ports for opening communication from a source of fluid pressure supply to the brake cylinder in emergency position.

3. In a fluid pressure brake, the combination with a train pipe and a triple valve, of a pipe line communicating with the triple valve exhaust port, a connection from said pipe line to the brake cylinder, and a brake valve having ports for connecting said pipe line to the atmosphere in one position and to a source of fluid pressure in emergency position.

4. In a fluid pressure brake, the combination with a train pipe, auxiliary reservoir, triple valve and brake cylinder, of a brake valve adapted to control the exhaust from the triple valve and having means in one position for venting fluid from the train pipe, and for supplying fluid from another source to the brake cylinder.

5. In a fluid pressure brake, the combination with a train pipe, auxiliary reservoir, triple valve and brake cylinder, of a release pipe connected to the triple valve exhaust port, a check valve controlled connection from the release pipe to the brake cylinder, and a brake valve having means for venting fluid from the train pipe and supplying fluid to the release pipe in emergency position.

6. A triple valve device comprising a piston, a main and an auxiliary valve, having a movement relative to said main valve, operated by said piston, and a stop device secured to said main valve to prevent the main valve from over-riding the normal release position thereof.

7. In a fluid pressure brake, the combination with a train pipe and triple valve operated upon a sudden reduction in train pipe pressure for supplying air to the brake cylinder, of a brake valve having means adapted in emergency position to vent air from the train pipe and supply air directly to the brake cylinder.

8. In a fluid pressure brake, the combination with a train pipe, triple valve, and brake cylinder, of a brake valve adapted to supply air through a direct passage to the brake cylinder in emergency application position and a feed valve device for regulating the pressure of air supplied both to the train pipe and to said direct passage.

In testimony whereof I have hereunto set my hand.

WALTER V. TURNER.

Witnesses:
R. F. EMERY,
WM. M. CADY.